US009870640B2

(12) United States Patent
Sathe et al.

(10) Patent No.: US 9,870,640 B2
(45) Date of Patent: *Jan. 16, 2018

(54) TECHNIQUES AND ARCHITECTURE FOR IMPROVED VERTEX PROCESSING

(71) Applicant: Intel Corporation, Santa Clara, CA (US)

(72) Inventors: Rahul P. Sathe, Emeryville, CA (US); Tim Foley, Concord, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/961,755

(22) Filed: Dec. 7, 2015

(65) Prior Publication Data
US 2016/0321834 A1 Nov. 3, 2016

Related U.S. Application Data

(63) Continuation of application No. 14/039,732, filed on Sep. 27, 2013, now Pat. No. 9,208,602.

(51) Int. Cl.
G09G 5/36 (2006.01)
G06T 1/60 (2006.01)
G06T 15/00 (2011.01)

(52) U.S. Cl.
CPC .............. *G06T 15/005* (2013.01); *G06T 1/60* (2013.01); *G06T 2200/28* (2013.01)

(58) Field of Classification Search
CPC .. G06T 1/60; G06F 12/0875; G09G 2360/121
USPC ........................................ 345/530, 531, 557
See application file for complete search history.

(56) References Cited

U.S. PATENT DOCUMENTS

| 8,698,825 B1* | 4/2014 | Lukka | G06T 15/005 345/536 |
| 2008/0204451 A1* | 8/2008 | Im | G06T 15/005 345/419 |
| 2009/0073177 A1* | 3/2009 | Jiao | G06T 15/005 345/501 |
| 2010/0274974 A1* | 10/2010 | Van De Waerdt | G09G 5/39 711/136 |
| 2010/0302246 A1* | 12/2010 | Jiao | G06T 1/20 345/426 |

* cited by examiner

Primary Examiner — Jacinta M Crawford

(57) ABSTRACT

An apparatus may include an index buffer to store an index stream having a multiplicity of index entries corresponding to vertices of a mesh and a vertex cache to store a multiplicity of processed vertices of the mesh. The apparatus may further include a processor circuit, and a vertex manager for execution on the processor circuit to read a reference bitstream comprising a multiplicity of bitstream entries, each bitstream entry corresponding to an index entry of the index stream, and to remove a processed vertex from the vertex cache when a value of the reference bitstream entry corresponding to the processed vertex is equal to a defined value.

22 Claims, 9 Drawing Sheets

```
Void GenerateStream (const uint16 * pIB,    // Index Buffer
        uint numIndices ,                    // Size of Index Buffer
        bool * pStream)                      // Output 1-bit stream
{
   std: :set<uint16> iSet;
   for   (i = numIndices -1:  i  >= 0; --i)
   {
       if (!iSet: :find(pIB[i])) {
       pStream[i] = true;
       } else {
         pStream[i] = false
       }
    }
}
```

*FIG. 6*

TECHNIQUES AND ARCHITECTURE FOR IMPROVED VERTEX PROCESSING

CROSS-REFERENCE TO RELATED APPLICATIONS

This application is a continuation of, claims the benefit of and priority to previously filed U.S. patent application Ser. No. 14/039,732 filed Sep. 27, 2013, entitled "TECHNIQUES AND ARCHITECTURE FOR IMPROVED VERTEX PROCESSING", the subject matter of which is incorporated herein by reference in its entirety.

TECHNICAL FIELD

Embodiments described herein generally relate graphics processing and in particular to graphics pipeline processing.

BACKGROUND

In processing data to generate an image, graphics processor units (GPU) performance and power consumption is directly related to the choice of input topology used to model the objects presented in an image. In the present day, graphics processors typically render images using triangles as primitives that are organized into meshes in which the triangles are indexed. In present day processing, triangles or other primitives are subject to a series of operations in a graphics pipeline such as vertex shading, clipping, setup, and rasterization.

At the vertex shading stage, graphics processing circuitry such as graphics processor units (GPUs) take advantage of indexed organization by employing a cache in hardware, which is often referred to as a vertex cache or a vertex shader cache, whose function is to cache the results of shaded vertices. A vertex shader is used to transform the attributes of vertices of a triangle such as color, texture, position and direction from the original color space to the display space. The vertex shader may reshape or distort original objects in a desired manner.

When a vertex with the same index as a previously processed vertex is to be shaded again, e.g., because it appears in another triangle or primitive, the vertex cache is interrogated by a look-up operation. If the vertex is still present in the vertex cache, shading of that vertex is skipped altogether. This process is transparent to the user and saves execution resources and power. The vertex cache is often organized as a finite sized first-in-first-out (FIFO) buffer, such that vertex shading can be saved so long as the shaded vertex is still in the vertex cache. The hit rate of the vertex cache increases with increased cache capacity because a given shaded vertex may be preserved longer within a larger FIFO type cache before being bumped out of the cache. In this manner larger caches may be desired to perform vertex processing with a higher hit rate. However, larger cache requires more circuitry real estate, for example, a larger static random access memory (SRAM) array, which memory requires many transistors to store one bit, such as six transistors per bit in a common layout.

Given the tradeoffs mentioned above there may be a need for improved techniques and apparatus to solve these and other problems.

BRIEF DESCRIPTION OF THE DRAWINGS

FIG. 6 depicts exemplary pseudocode for generation of a reference bitstream.

DETAILED DESCRIPTION

The present embodiments are related to architecture and methods for improved processing in a graphics pipeline. In particular, the present embodiments involve novel treatment of vertices of primitives to be assembled into a mesh that facilitate use of a vertex cache in a more efficient manner than in conventional approaches. In particular, as detailed below the present embodiments facilitate increasing the hit rate in a vertex shader cache without increasing the cache capacity.

In the present embodiments, a reference bitstream is provided to signal or indicate the status of vertices of a mesh being assembled in response to a draw call. By way of reference, it is noted that in order to draw an object on a display screen, a component such as a general purpose processor circuit (CPU) issues a draw call to a component such as a graphics application programmable interface (API). In particular, a draw call occurs when a component such as the CPU sends a block of data to be processed by a graphics processor (GPU), resulting in generating an object as a mesh of polygons, such as a mesh of triangles. In known vertex pipelines, in response to a draw call vertices of objects to be rendered are processed through multiple stages, including, for example, vertex shading, clipping, setup, and rasterization. During one or more of these stages when a vertex is processed it may be stored in a cache dedicated to that stage, such as a vertex shader cache. Depending upon the organization and procedures for populating such caches, the vertex pipeline can be managed more or less efficiently. As detailed with respect to the embodiments to follow, the reference bitstream may be employed to selectively remove from a cache the processed vertices of polygons to form the mesh, when those processed vertices are no longer needed. In particular embodiments, shaded vertices may be removed from a vertex shader cache in a timely fashion that increases the effective size of the cache for purposes of vertex management without increasing the physical cache size.

Figure 1:
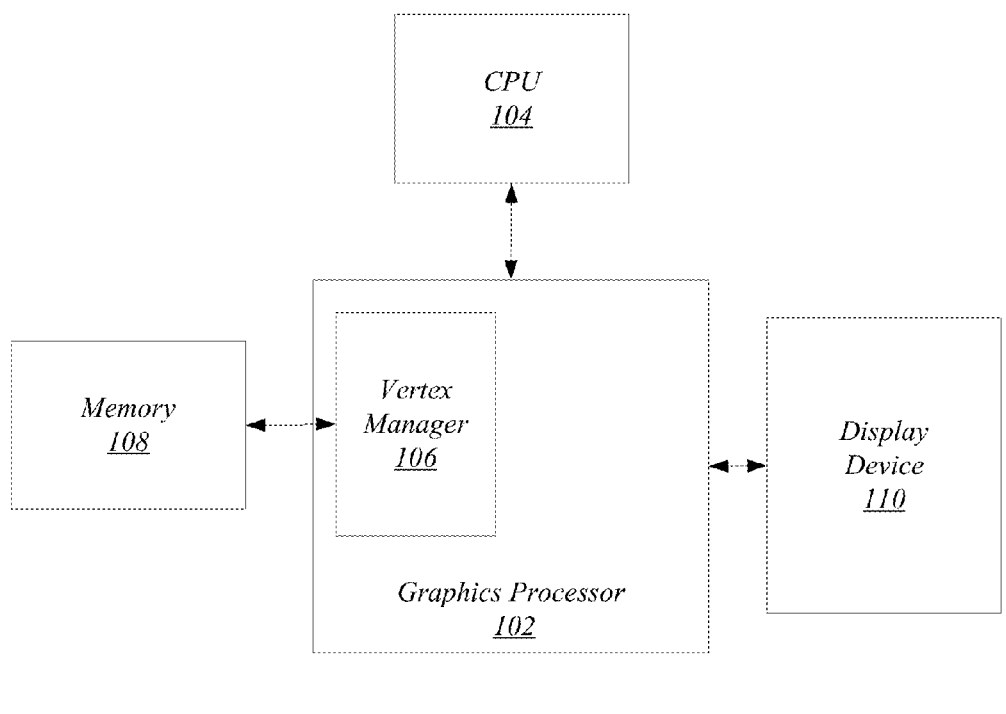
FIG. 1 illustrates a block diagram for an exemplary apparatus.

FIG. 1 depicts one example of architecture for an apparatus 100 consistent with the present embodiments. A graphics processor 102 (also termed "GPU") is coupled to a memory 108 and a general processor (CPU) 104, which may issue commands and data to the GPU 102 during processing for images to be presented on the display device 112. In different embodiments the CPU 104 may be disposed within the same semiconductor die or within a separate die as that of the GPU 102. The apparatus 100 of FIG. 1 may be embodied, for example, in a laptop computer, tablet computing device, desktop computer, smartphone, cellular telephone or other electronic computing device or communications device, a television (TV), or videogame device. The embodiments are not limited in this context.

As further illustrated in FIG. 1, the GPU 102 may include a vertex manager 106 whose operation is detailed with respect to FIGS. 2-8. In various embodiments the GPU 102 and vertex manager 106 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Examples of a display device 110 include a liquid crystal display (LCD), light emitting diode display (LED), touch sensitive display, plasma display, cathode ray tube, and other display types.

Figure 2:
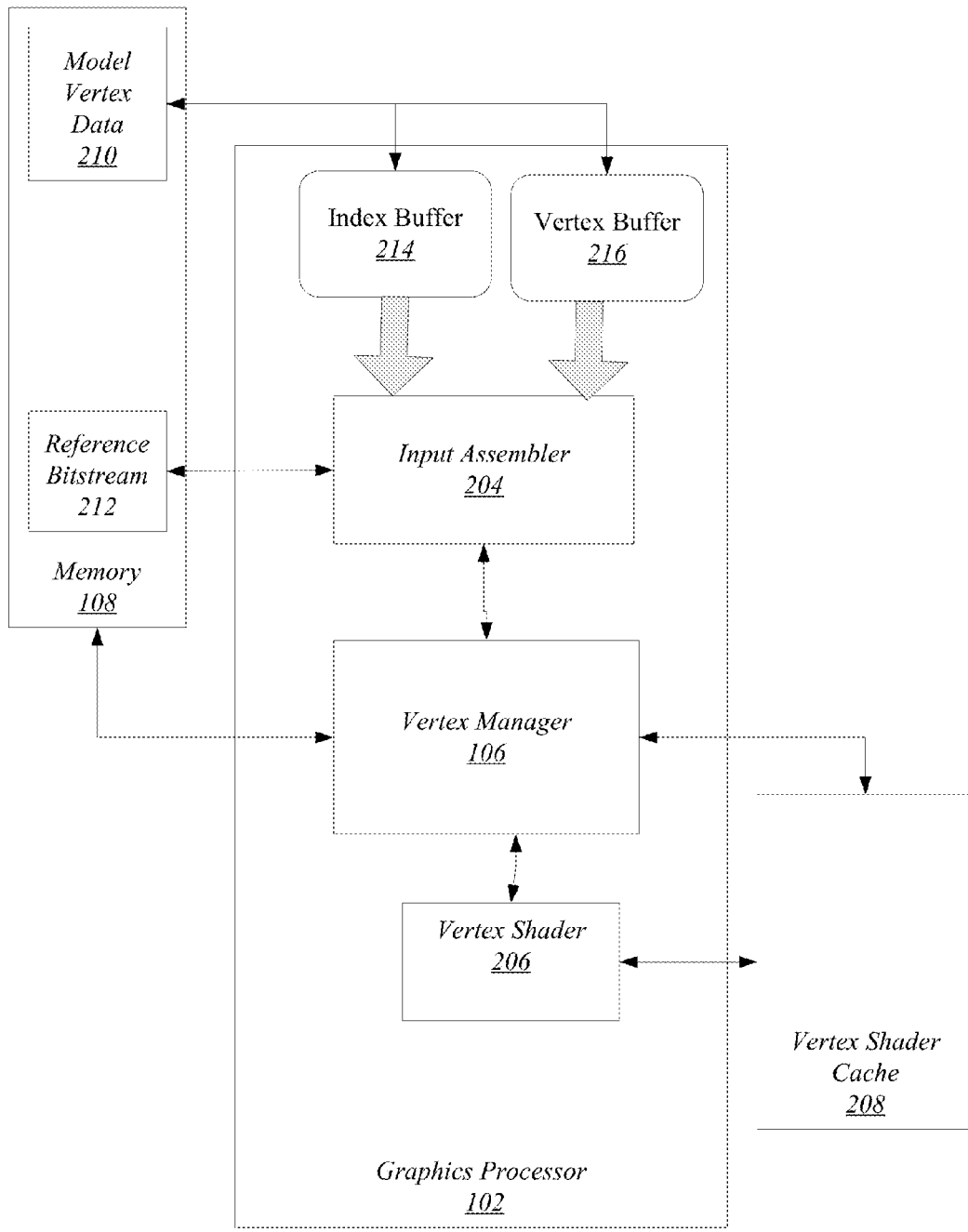
FIG. 2 depicts a block diagram of an exemplary graphics processor.

FIG. 2 depicts details of one embodiment of the GPU 102. In this example, GPU 102 includes an input assembler 204 and vertex shader 206. In particular, the input assembler 204 may read vertex related data and may assemble the vertex related data into primitives that may be used at subsequent stages of a graphics pipeline. Although shown as a separate component, the vertex manager 106 may form part of the input assembler 204 in some embodiments. In response to a draw call, the input assembler 204 may receive data from memory 108 for primitive assembly. In the example of FIG. 2, a given mesh to be drawn may be constructed using a set of model vertex data 210 and a reference bitstream 212. The model vertex data 210 is used to construct an index buffer 214 and vertex buffer 216. For a given draw call to construct a given object or mesh a predetermined or defined stream of indices that constitutes the index buffer 214 may be produced. The stream of indices is read in a fixed manner so that a given mesh is constructed as a fixed sequence of vertices.

The reference bitstream 212 may track the stream of indices such that there is a one-to-one correspondence between the reference bitstream 212 and stream of indices. Accordingly, when the vertex manager reads the reference bitstream, the read bits of the reference bitstream allow the vertex manager 106 to determine how to process a given shaded vertex as each vertex of a model is fetched. This allows the graphics processor 102 and more particularly the vertex manager 106 to more efficiently manage a vertex cache, such as the vertex shader cache 208. One example of efficient management of the vertex shader cache 208 provided by the present embodiments is the ability to selectively remove shaded vertices, so that shaded vertices are not maintained in the shaded vertex shader cache 208 for an unnecessarily long duration. In particular, in addition to determining when to forward a shaded vertex for primitive assembly, the vertex manager 106 may employ the reference bitstream to determine when to insert a shaded vertex into the vertex shader cache 208, and when to remove a shaded vertex from the vertex shader cache 208.

In various embodiments the vertex shader cache 208 may be arranged as a "modified FIFO" structure in which shaded vertex entries are arranged in a queue within the vertex shader cache 208 similarly to conventional FIFO buffers. A newest entry is placed at the back of the queue and older entries (First In) are placed towards the front of the queue, where the oldest entry may be deleted when reaching the front of the queue if the vertex shader cache 208 is full. However, the vertex manager 106 operates in conjunction with the reference bitstream 212 to modify the strict FIFO structure of the vertex shader cache 208 that may otherwise exist. In particular, the vertex manager 106 may remove a given shaded vertex from the vertex shader cache 208 according to the value of a bit of the reference bitstream 212 associated with the given shaded vertex, even if the shaded vertex is not in the front of the queue of the vertex shader cache 208. As detailed below, this removal of the shaded vertex from the vertex shader cache 208 takes place when a determination is made based upon the reference bitstream 212 that the shaded vertex in question will not be referenced again during the primitive assembly process.

Figure 3:
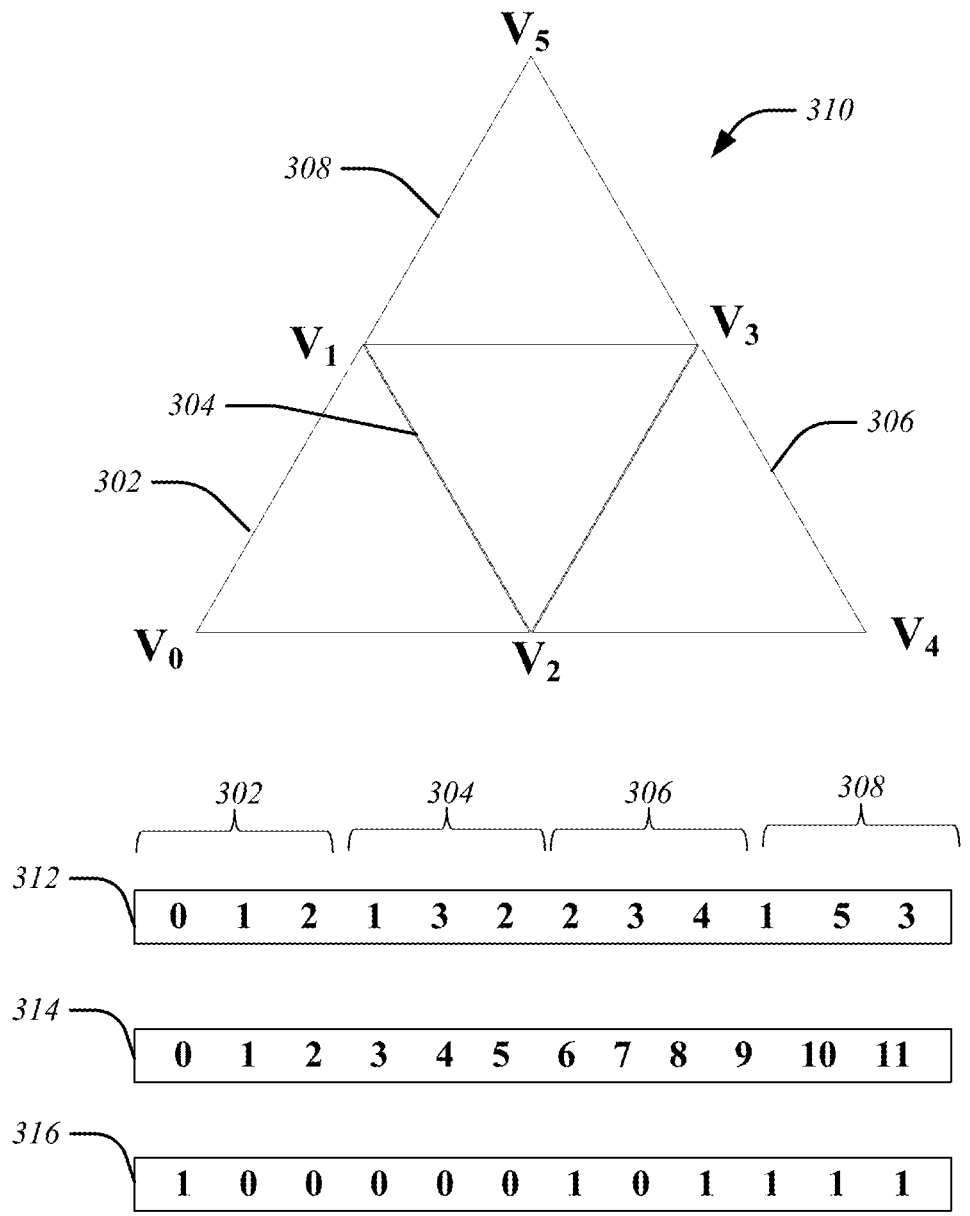
FIG. 3 depicts an example of processing a set of triangles consistent with the present embodiments.

FIG. 3 depicts an example of processing a set of triangles consistent with the present embodiments. In FIG. 3 there is shown an arrangement of four triangles 302, 304, 306, 308 that constitute a mesh 310. The mesh 310 is arranged to generate an object in the shape of a larger triangle. Each triangle 302, 304, 306, 308 is defined by a set of three vertices. For example, triangle 302 is defined by the vertices V0, V1, V2, while triangle 304 is defined by vertices V2, V1, V3, and so forth. As illustrated in FIG. 3, each triangle shares vertices with other triangles such that there are six unique vertices V0, V1, V2, V3, V4 and V5 that constitute the four-triangle mesh 310. These vertices form the basis for values that may be stored in an index buffer, such as the index buffer 312.

When processing vertices for primitive assembly, an index buffer stores index values of its associated vertex buffer. In the case of FIG. 3, there is shown an exemplary index buffer 312 and index buffer index 314 corresponding to the mesh 310. The index buffer 312 indicates the processing order of vertices for the mesh 310. Thus, triangle 302 is specified by the list "0, 1, 2" corresponding to vertices V0, V1, and V2; triangle 304 is specified by the list "1, 3, 2" corresponding to vertices V1, V3, and V2; triangle 306 is specified by the list "2, 3, 4" corresponding to vertices V2, V3, and V4; triangle 308 is specified by the list "1, 5, 3" corresponding to vertices V1, V5, and V3. The associated index buffer index 314 is a list of sequentially increasing numbers from 0 to 11 in this case. When processed by an input assembler the index buffer 312 may be read as an index stream such as "0, 1, 2, 1, 3, 2, 2, 3, 4, 1, 5, 3."

Consistent with the present embodiments, a reference bitstream 316 is also shown in FIG. 3. The reference bitstream 316 provides a designation of the status of vertices being fetched and thereby provides an indication of processing to be performed on vertices associated with the index buffer 312 as follows. When a vertex is processed in a graphics pipeline after a vertex is fetched, vertex shading is performed before subsequent processing such as clipping, setup, and rasterization. The shaded vertex may be stored in a vertex shader cache such as the vertex shader cache 208 and/or may be sent for primitive assembly. As illustrated by the index stream provided by the index buffer 312, because the same vertex may be used in multiple triangles, often the same index appears multiple times within an index stream.

In known techniques, in order to limit redundant vertex shading for vertices encountered multiple times within the mesh, the vertex shader cache may be queried to determine cache hits for a given vertex. In the event of cache hit in the vertex shader cache for a given vertex, vertex shading of the already shaded vertex may be eliminated. However, because of a strict first-in-first-out structure of conventional vertex shader cache, such shaded vertices may remain in cache even when the vertices associated with the stored shaded vertices in the vertex shader cache will no longer be referenced in the mesh construction. As further shown in FIG. 3, the present embodiments address this situation by providing the reference bitstream 316, which takes advantage of the fixed order for assembly of a mesh to provide an indication of the status of a vertex being processed. In particular, for each vertex of a given mesh, such as the mesh 310, it can be determined when that vertex is referenced the last time in an index stream. For example, the vertex V0 corresponding to value "0" of index buffer 312 is referenced once and only once in the index stream, while the vertex V3, corresponding to value "3" of index buffer 312 occurs on three separate occasions. In the latter case, the vertex V3 is used in the triangles 304, 306, 308. A function of the reference bitstream 316 is to provide an indication of the "status" of a given vertex of the mesh. In various embodiments, the reference bitstream 316 is composed of a stream of entries in which each bitstream entry indicates whether a vertex is to be referenced subsequently during mesh assembly. In various embodiments, a predetermined or defined value of the reference bitstream 316 is used to indicate that a given vertex is not referenced subsequently. For example, the reference bitstream 316 may be a 1-bit bitstream in which each entry is a single bit. In different embodiments, either a "0" or "1" may be used to indicate that a vertex is to be subsequently referenced. For example, in one embodiment of a 1-bit bitstream, the value of "0" indicates that a corresponding vertex will be referenced again within the index stream, while a value of "1" indicates that the vertex will not be referenced subsequently.

As illustrated in the example of FIG. 3, the bit values of the reference bitstream 316 provide an indication of the status of corresponding entries in the index buffer 312. Thus, reading from left to right, the first entry of buffer index 312 has a value "0" corresponding to the vertex V0. As shown in FIG. 3, vertex V0, which is only used within triangle 302, is only referenced once, which is reflected in the single entry of buffer index 312 with the value "0." Because this represents the last reference to the vertex V0, the corresponding entry for the reference bitstream 312 is set to"1" as shown. The next entry in the buffer index 312 has a value of "1" corresponding to the vertex V1. This vertex is in the triangles 302, 304, and 308. Accordingly, after this initial entry, the vertex V1 is to be referenced on subsequent occasions. Thus, the corresponding entry for the reference bitstream 312 is set to "0." The following entry in the buffer index 312 has a value of "2" corresponding to the vertex V2. This vertex is in the triangles 302, 304, and 306. Accordingly, after this initial entry, the vertex V2 is to be referenced on subsequent occasions. Thus, the corresponding entry for the reference bitstream 312 is set to "0."

In the construction of triangle 304, the vertices V1, V3, and V2 are processed in that order. In this case, as illustrated by the entry in buffer index 312, each of vertices V1, V2, and V3, are referenced at least upon one occasion subsequently in the mesh 310. Accordingly, the corresponding fourth, fifth and sixth entries of the reference bitstream 316 each are set to "0" to indicate that the corresponding vertex is referred to subsequently.

Continuing with the construction of triangle 306, FIG. 3 shows that the vertices V2, V3, and V4 are processed in that order. In this case, the vertices V2 and V4 are referenced for the last time in the mesh 310. Accordingly, the corresponding seventh and ninth entries of the reference bitstream 316 are set to "1" to indicate that the vertex V2 and the vertex V4 are not referred to subsequently. On the other hand, the reference bitstream 316 also shows that the vertex V3 is subsequently referenced. Thus, the corresponding eighth entry of the reference bitstream 316 is set to "0" to indicate that the corresponding vertex V3 is referred to subsequently.

Finally, for the construction of triangle 308, the vertices V1, V5, and V3 are processed in that order. Each of these vertices are referenced for the last time in the mesh 310 and the corresponding tenth to twelfth entries of the reference bitstream 316 set to "1" to indicate as much.

Consistent with various embodiments a reference bitstream such as the reference bitstream 316 may be employed to perform various actions as noted above. For one, the reference bitstream 316 may be queried to determine whether a given shaded vertex that may already reside in a vertex shader cache is to remain in the cache or be removed from the cache. Referring to FIG. 3 again for example, shaded vertices of a mesh that are associated with reference bits of the reference bitstream 316 that have the value of "1" may be flagged for removal from a vertex shader cache. This is because the shaded vertices in question will not be referenced subsequently during construction of the mesh. Thus, for example, if the vertex shader cache 208 returns a hit for a given vertex and the reference bitstream 316 returns a value of "1" for an entry corresponding to the shaded vertex, the shaded vertex may be removed from vertex shader cache 208. Since there may be little value in retaining the shaded vertex in question in cache, its removal frees up cache space without penalty to vertex processing.

Likewise, in the case of a cache miss in the vertex shader cache 208 for a given vertex, if the reference bitstream 316 returns a value of "1" for an entry corresponding to the shaded vertex, the vertex manager 106 may refrain from inserting the vertex in question into vertex shader cache 208, since the vertex will not be subsequently referenced again during construction of the mesh.

This non-insertion or selective removal of shaded vertices from the vertex shader cache has the salutary effect of creating room in cache for another vertex that may likely get referenced at some point in the future. This has the same effect as increasing the size of a FIFO type vertex shader cache. In other words for each shaded vertex removed in response to a return of a value of "1" in a reference bitstream, an "extra" shaded vertex may be inserted into the vertex shader cache vertices without bumping the shaded vertex at the front of the queue from cache.

Figure 4:
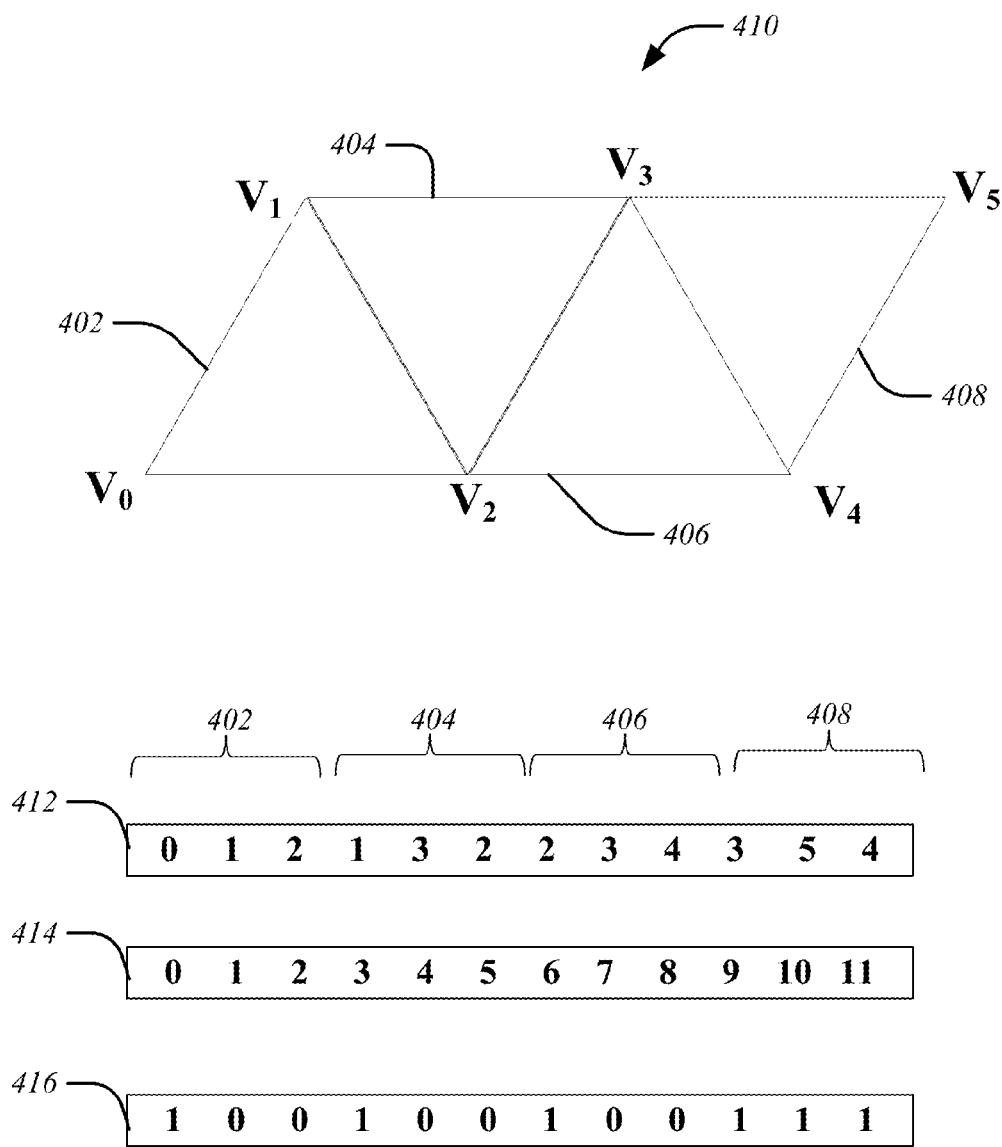
FIG. 4 depicts another example of processing a set of triangles consistent with the present embodiments.

FIG. 4 depicts another example of processing a set of triangles consistent with the present embodiments. In FIG. 4 there is shown an arrangement of four triangles 402, 404, 406, 408 that constitute a mesh 410. The mesh 410 is arranged in the shape of a strip. As in the example of FIG. 3, each triangle 402, 404, 406, 408 is defined by a set of three vertices. For example, triangle 402 is defined by the vertices V0, V1, V2, while triangle 304 is defined by vertices V1, V3, V2, and so forth. As illustrated in FIG. 4, each triangle shares vertices with other triangles such that there are six unique vertices V0, V1, V2, V3, V4 and V5 that constitute the four-triangle mesh 410. These vertices form the basis for values that may be stored in an index buffer, such as the index buffer 312.

In the case of FIG. 4, there is shown an exemplary index buffer 412 and index buffer index 414 corresponding to the mesh 410. The index buffer 412 indicates the processing order of vertices for the mesh 410. Thus, triangle 402 is specified by the list "0, 1, 2" corresponding to vertices V0, V1, and V2; triangle 404 is specified by the list "1, 3, 2" corresponding to vertices V1, V3, and V2; triangle 406 is specified by the list "2, 3, 4" corresponding to vertices V2, V3, and V4; triangle 408 is specified by the list "3, 5, 4" corresponding to vertices V3, V5, and V4. The associated index buffer index 314 is a list of sequentially increasing numbers from 0 to 11 in this case. When processed by an input assembler the index buffer 312 may be read as an index stream such as "0, 1, 2, 1, 3, 2, 2, 3, 4, 3, 5, 4."

Consistent with the present embodiments, a reference bitstream 416 is also shown in FIG. 4 whose function is similar to that of reference bitstream 316 described above.

In the example of FIG. 4, the vertex V0 corresponding to value "0" of index buffer 412 is referenced once and only once in the index stream, while the vertex V3, corresponding to value "3" of index buffer 412 occurs on three separate occasions. In the latter case, the vertex V3 is used in the triangles 404, 406, 408. Thus, similarly to the scenario of FIG. 3, the entries for the reference bitstream 412 that correspond to value "3" of are set to "0" for the triangles 404 and 406. Only in triangle 408 in which vertex V3 is referenced for a final time is the value of the corresponding reference bitstream entry ($10^{th}$ entry) set to "1" to indicate the vertex V3 is not referenced subsequently. Likewise, the entries for the reference bitstream 412 that correspond to value "2" of are set to "0" for the triangles 402 and 404. Only in triangle 406 in which vertex V2 is referenced for a final time is the value of the corresponding reference bitstream entry ($7^{th}$ entry) set to "1" to indicate the vertex V2 is not referenced subsequently.

A comparison of FIGS. 3 and 4 shows that the different mesh topologies of the meshes 310 and 410 produce a different reference bitstream corresponding to respective reference bitstreams 316 and 416. However, in each case, the arrangement of reference bits provides an indication that at least some of the vertices of a given mesh may be removed from a vertex shader cache out of the order otherwise set by a first-in-first-out protocol. For example, for the purposes of illustration it may be assumed that a vertex shader cache size is just sufficient to store shaded vertices corresponding to the index buffer 312, 412, where only twelve entries may be stored at one time. In a strict FIFO buffer structure, the first entry read into the cache is the first to be deleted from the cache. Another manner of stating this is that an entry that enters a conventional FIFO buffer does not get deleted from the buffer until a number of entries equaling the buffer size are subsequently inserted into the FIFO buffer.

Thus, in the example of a vertex shader buffer having a size to just accommodate shaded vertices corresponding to the index buffers 312, 412, in a conventional FIFO arrangement, six shaded vertices are inserted into the shaded vertex buffer after insertion of an initial shaded vertex before that initial shaded vertex is removed from the vertex shader buffer. This means that the entire index buffer 312, 412 is read by an input assembler before the vertex associated with the first entry in the index buffer 312 would be slated for removal. This is so even if the shaded vertex in question is no longer referenced after the first triangle of a mesh is fetched.

However, in the present embodiments, as illustrated in both FIGS. 3 and 4, a shaded vertex may be removed in a much more timely fashion from a vertex shader buffer. In particular, in each case, the reference bitstreams 316, 416 designate that shaded vertices corresponding to all of the entries of the respective index streams 312, 412 may be removed from or not inserted into a vertex shader cache in advance of when such vertices would be deleted in a conventional FIFO arrangement. Thus, in some cases a given shaded vertex may be removed from a vertex shader cache before another shaded vertex having greater residence time in the vertex shader cache. In other words, if the given shaded vertex is associated with a value of "1" in its associated reference bitstream, the given shaded vertex may be removed from the vertex shader cache before another shaded vertex that was added before the given shaded vertex and has therefore resided in the vertex shader cache longer. On the other hand, if a given shaded vertex is associated with a value of "0" in its associated reference bitstream, the given shaded vertex may be preserved within a vertex shader cache, that is, the vertex manager leaves the shaded vertex unperturbed within the vertex shader cache.

This is particularly illustrated by the case of processing vertices V1 and V2 for the construction of the mesh 310 in FIG. 3. During processing of the first triangle 303 vertex V1 is processed first and a shaded vertex corresponding to V1 may be stored first in a vertex shader buffer. Subsequently, vertex V2 is processed and its shaded vertex may be stored in a vertex shader buffer after that of the vertex V1. During processing of the triangle 304, the reference bit corresponding to V2 ($7^{th}$ entry of reference bitstream 316) returns a value of "1" which may trigger removal of the shaded vertex of V2 from the vertex shader cache since it will not be referenced in the subsequent triangle 308. In contrast, the reference bit values associated with vertex V1 are "0" until the processing of the last triangle 308. Thus, vertex V1 may remain in cache until processing of triangle 308, where the reference bitstream entry of "1" indicates that vertex V1 will not be referenced again. Thus, the reference bitstream 316 manages the lifetime of a shaded vertex V2 within a vertex shader cache in a manner that removes the shaded vertex before removal of an "older" shaded vertex corresponding to vertex V1. This process may be much more efficient than allowing shaded vertices to proceed through a cache in a strict FIFO type queue since, depending upon the topology of the mesh being constructed, some shaded vertices may have a much shorter residence time.

It is to be reemphasized that the vertex shader cache of the present embodiments may still handle shaded vertices on a modified first-in-first-out basis subject to the modifications imposed by operation of the reference bitstream described herein. Thus, if a given shaded vertex reaches the front of the queue in a vertex shader cache, insertion of an additional shaded vertex may still cause the given shaded vertex to be deleted from cache even if the associated vertex may be referenced subsequently during assembly of a mesh. However, by providing a mechanism for timely removal of shaded vertices from the vertex shader cache out of order in a FIFO queue for those vertices not subject to further reference, the shaded vertices for vertices to be referenced again may be preserved longer in cache before reaching the front of the queue. As compared to a strict FIFO cache, this increases the likelihood of such a shaded vertex returning a hit in a subsequent operation even though the size of the vertex shader cache is not increased.

Figure 5:
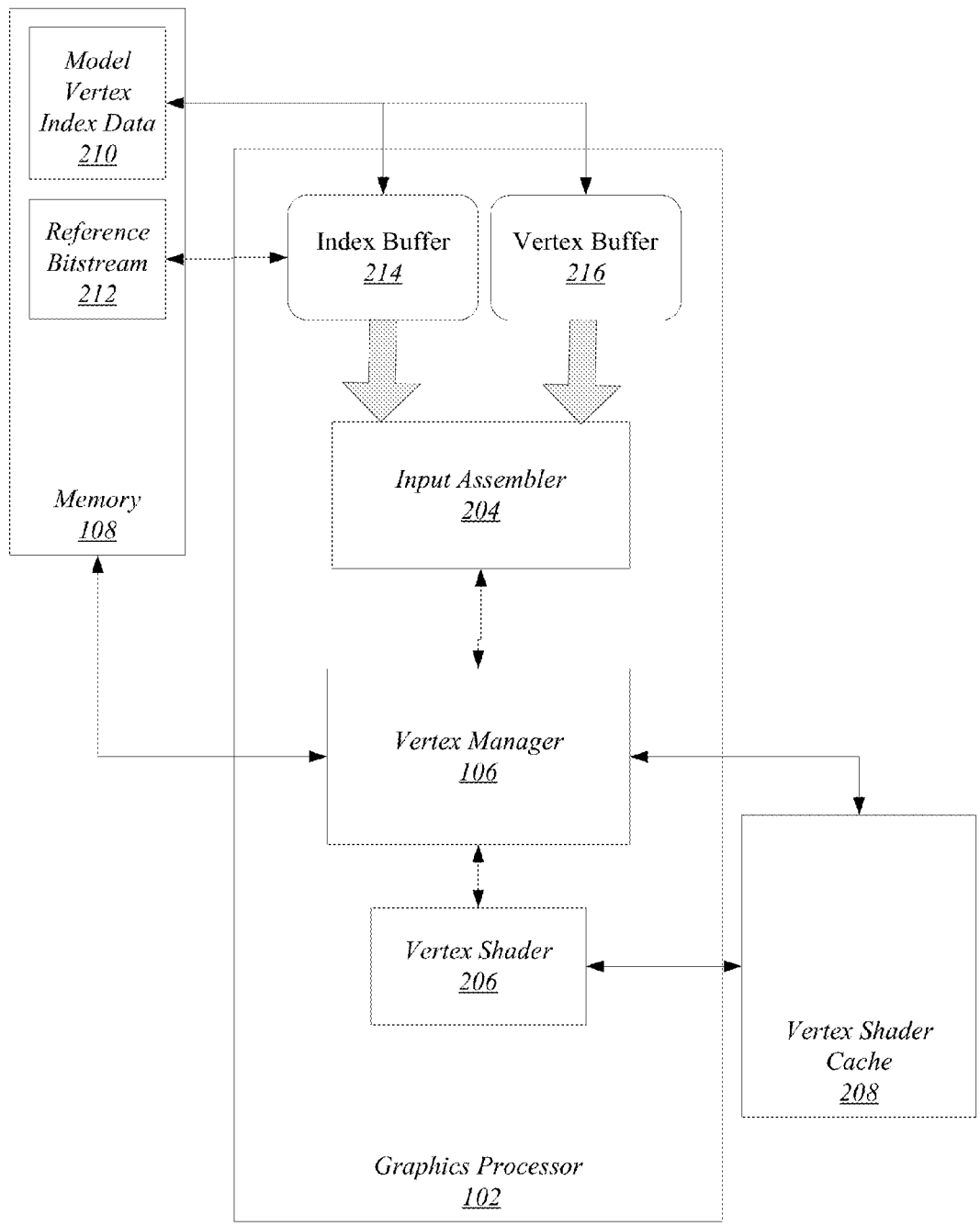
FIG. 5 depicts a block diagram of another exemplary graphics processor.

Although the example of FIG. 2 illustrates architecture in which a reference bitstream is supplied separately from an index buffer, in other embodiments the reference bitstream may be supplied within the index buffer. In some instances a 16 bit index buffer, or 32 bit index buffer may not employ all bits to generate an index stream. In this case, a software component such as driver software may generate a 1-bit bitstream corresponding to the vertices referenced by the index buffer, and may insert this into a bit such as the most significant bit (MSB) of the index buffer. The MSB of the index buffer may then be read as the reference bit to determine vertex processing as detailed above. Notably, a vertex manager arranged in accordance with this embodiment may modify operation so that the vertices are read only form the lower 15 (or 31) bits of an index buffer. FIG. 5 depicts details of another embodiment of the GPU 102 in which a reference bitstream 212 and model vertex index data 210 are read into a common index buffer such as index buffer 214. In this arrangement, when the index buffer 214 is read, the status of each associated vertex is automatically supplied so that a component can determine the appropriate action if any to employ for a shaded vertex.

In one implementation, driver software only need place the 1 bit bitstream into the most significant bit of an index buffer during the first time the index buffer is encountered in a first run. In one particular embodiment, the 1 bit bitstream may be generated by reading the index buffer in reverse order and creating a standard template library (STL) set-like structure (std::set). In operation, the bit is set to "1" when an entry is inserted into a set and set to "0" when it is found in the STL set-like structure. An example of pseudo-code to perform this function is illustrated in FIG. 6.

It is to be noted that the present embodiments may be implemented for different mesh topologies including trilist topologies, tri-strip topologies, and hybrid topologies between trilist and tristrip topologies.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
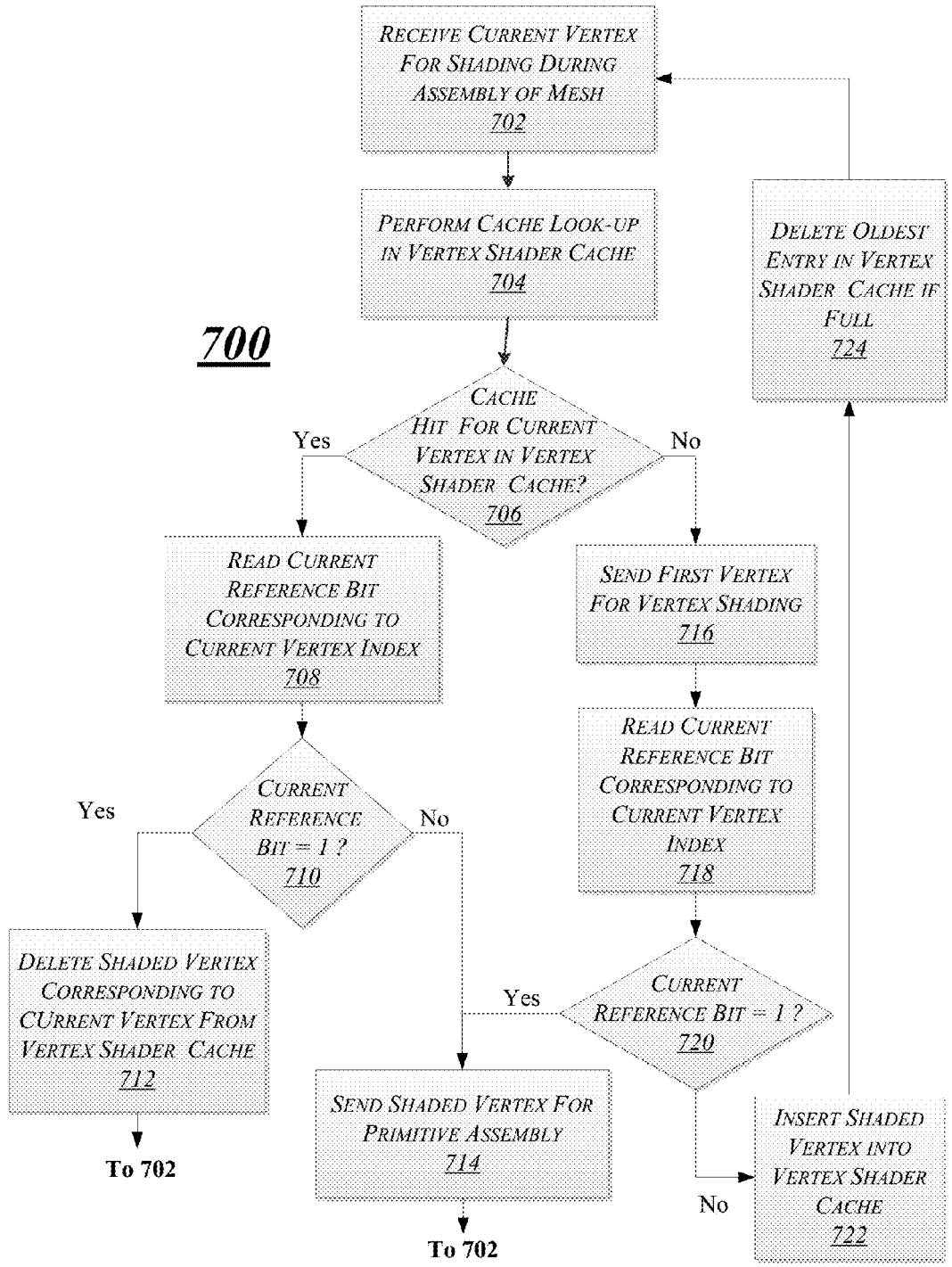
FIG. 7 depicts an exemplary first logic flow.

FIG. 7 depicts an exemplary first logic flow 700. The flow may be implemented by a component such as a graphics processor and/or a component or program operating thereon. At block 702 a current vertex is received for shading during assembly of a mesh. The flow then moves to block 704 where a look-up is performed for the received (fetched) current vertex in a vertex shader cache. In various embodiments the vertex shader cache may have at least some properties of a first-in-first-out buffer wherein entries are arranged in a queue such that older entries are generally slated for deletion before newer entries when the buffer is full.

At the block 706 a determination is made as to whether a cache hit has occurred for the current vertex in the vertex shader cache. A cache hit occurs when a shaded vertex is found in the vertex shader cache corresponding to the current vertex. If, at block 706 a cache hit occurs, the flow moves to block 708.

At block 708, a current reference bit corresponding to a current vertex index of the current vertex is read. The current reference bit may be a one-bit entry in a reference bitstream that contains an entry for each vertex index of an index buffer that indexes vertices being fetched for the mesh assembly. After block 708, the flow moves to the decision block 710.

At block 710 it is determined whether the current reference bit has a value equal to "1." If so, the flow moves to block 712, where the shaded vertex corresponding to the current vertex is deleted from the vertex shader cache. If at block 710, the bit value of the current reference bit is not equal to "1" the flow proceeds to block 714.

At block 714, the shaded vertex found in the vertex shader cache for the current vertex is sent for primitive assembly. The shaded vertex may remain in the vertex shader cache for future reference during the mesh assembly.

Returning to decision block 706, if no cache hit is found in the vertex shader cache, the flow proceeds to block 716 where the current vertex is sent for vertex shading. The flow then proceeds to block 718 where a current reference bit corresponding to the current vertex index of the current vertex is read. The flow then proceeds to the decision block 720.

At decision block 720, a determination is made as to whether a current reference bit corresponding to the current vertex index of the shaded vertex is equal to "1." If so, the flow proceeds to block 714 where the shaded vertex is sent for primitive assembly. In this case the shaded vertex is not stored at all in the vertex shader cache because, although no hit in the vertex shader cache occurred indicating that the vertex was not previously shaded, the reference bitstream entry of "1" indicates that the vertex will not be subsequently referenced. Accordingly, the shaded vertex is forwarded for primitive assembly directly after shading of the vertex.

If the reference bit value does not equal "1" at decision block 720, the flow proceeds to block 722 where the shaded vertex is inserted into a vertex shader cache for subsequent reference during the mesh assembly. The flow then proceeds to block 724.

At block 724, an oldest entry of the vertex shader cache is deleted if the vertex shader cache is full such that insertion of the shaded vertex in block 722 requires deletion of a shaded vertex from the vertex shader cache. The flow then returns to block 702 where a new (current) vertex is received for shading.

Figure 8:
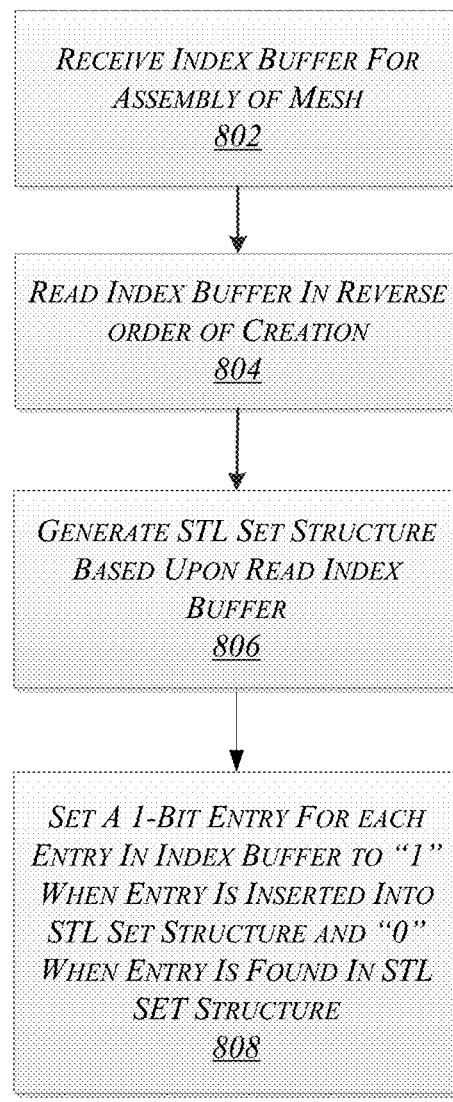
FIG. 8 depicts an exemplary second logic flow.

FIG. 8 illustrates an embodiment of an exemplary second logic flow 800. The logic flow 800 begins with the block 802 where an index buffer is received for processing for assembly of a mesh.

The flow then proceeds to block 804 where the index buffer is read in reverse order of entry creation. Thus, a last entry of the index buffer is read first and a first entry read last.

At the block 806, an STL set like structure is generated based upon the read index buffer. The flow then proceeds to block 808. At the block 808, a 1-bit entry is set for each entry in the index buffer where the value of the 1-bit entry is set to "1" when the entry is inserted into the STL set structure, and set to "0" when the entry is found in the STL set structure.

Figure 9:
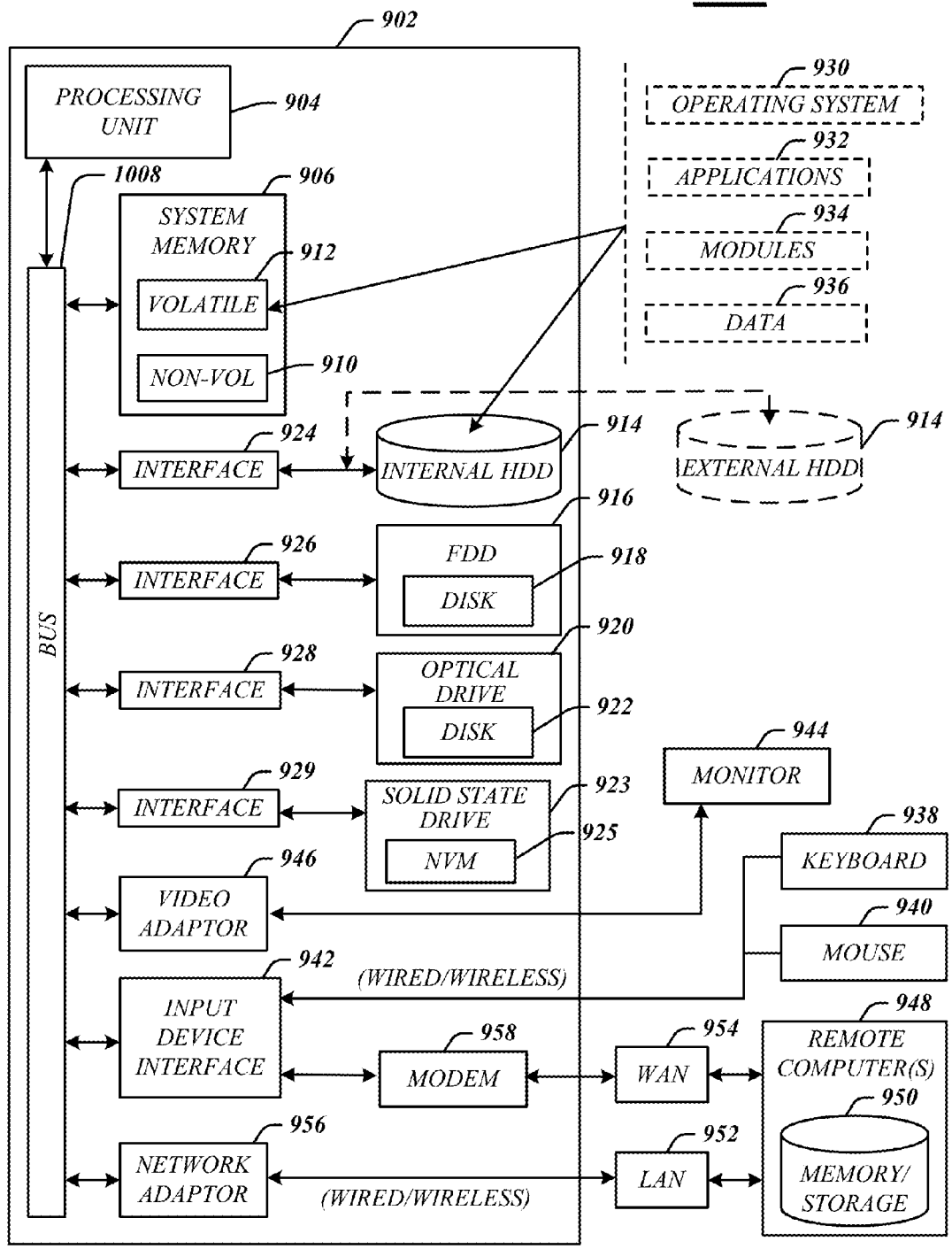
FIG. 9 is a diagram of an exemplary system embodiment.

FIG. 9 depicts a computing architecture 900 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 900 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 900 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors. Dual microprocessors and other multi-processor architectures may also be employed as the processing unit 904. The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures.

The computing architecture 900 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD); and a solid state drive (SSD) 923 to read or write data to/from a non-volatile memory (NVM) 925, including a NAND flash memory, phase change memory (PCM), a spin memory; phase change memory with switch (PCMS), magnetoresistive random access memory (MRAM), spin memory, nanowire memory, ferroelectric transistor random access memory (FeTRAM). The HDD 914, FDD 916, optical disk drive 920, and solid state drive 923 can be connected to the system bus 908 by a HDD interface 924, an FDD interface 926, an optical drive interface 928, and a solid state drive interface 929, respectively. The HDD interface 924 for external drive implementations can include at least one or both of Universal Serial Bus (USB) and IEEE 1294 interface technologies. The solid state drive interface 929 may comprise any suitable interface for coupling to the host device, such as, for example, but not limited to, a serial advanced technology attachment (SATA) interface, a serial attached SCSI (SAS) interface, a universal serial bus (USB) interface, a peripheral control interface (PCI), or other suitable device interface.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936.

A user can enter commands and information into the computer 902 through one or more wire/wireless input devices, for example, a keyboard 938 and a pointing device, such as a mouse 940. Other input devices may include a microphone, an infra-red (IR) remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1294 serial port, a game port, a USB port, an IR interface, and so forth.

A monitor 944 or other type of display device is also connected to the system bus 908 via an interface, such as a video adaptor 946. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The following examples pertain to further embodiments.

In example 1, an apparatus for vertex processing includes an index buffer to store an index stream having a multiplicity of index entries corresponding to vertices of a mesh; a vertex cache to store a multiplicity of processed vertices of the mesh; a processor circuit; and a vertex manager for execution on the processor circuit to read a reference bitstream comprising a multiplicity of reference bitstream entries, each reference bitstream entry corresponding to an index entry of the index stream, and to remove a processed vertex from the vertex cache when a value of the reference bitstream entry corresponding to the processed vertex is equal to a defined value.

In example 2, the vertex cache of example 1 may include a first-in-first-out (FIFO) structure.

In example 3, the vertex manager of any of examples 1-2 may be for execution on the processor circuit to remove a first vertex from the vertex cache having less residence time in the vertex cache than a second vertex when the value of a reference bitstream entry for the first vertex is equal to the defined value.

In example 4, the vertex manager of any of examples 1-3 may be for execution on the processor circuit to preserve a vertex in the vertex cache when a value of the reference bitstream entry corresponding to the processed vertex is equal to a second defined value different than the defined value.

In example 5, the processor circuit of any of examples 1-4 may comprise a graphics processing unit (GPU).

In example 6, the reference bitstream of any of examples 1-5 may comprise a 1-bit bitstream in which the defined value is equal to one.

In example 7, the vertex cache of any of examples 1-6 may comprise a vertex shader cache to store the processed vertices as shaded vertices.

In example 8, the vertex manager of any of examples 1-7 may be for execution on the processor circuit to send the processed vertex for primitive assembly when the processed vertex is detected in the vertex cache and the value of the reference bitstream entry is equal to a second defined value different than the defined value.

In example 9, the vertex manager of any of examples 1-8 may be for execution on the processor circuit to send a processed vertex for primitive assembly without storing the processed vertex in the vertex cache when the reference bitstream entry is equal to the defined value and the processed vertex is not presently in the vertex cache.

In example 10, the index buffer of any of examples 1-9 may store the index stream and reference bitstream.

In example 11, the index buffer of any of examples 1-10 may store a plurality of index buffer entries comprising a defined bit size, the vertex manager for execution on the processor circuit to read a most significant bit (MSB) within each entry of the index buffer to determine a value of the reference bitstream entry.

In example 12, at least one computer-readable storage medium includes instructions that, when executed, cause a system to: read an index stream from an index buffer having a multiplicity of index entries corresponding to vertices of a mesh; read a reference bitstream comprising a multiplicity of bitstream entries, each bitstream entry corresponding to an index entry of the index stream; and send a signal to remove a processed vertex from a vertex cache when a value of the reference bitstream entry corresponding to the processed vertex is equal to a defined value.

In example 13, the at least one computer-readable storage medium of example 12 may include instructions that, when executed, cause a system to remove a first vertex from the vertex cache having less residence time in the vertex cache than a second vertex when the value of a reference bitstream entry for the first vertex is equal to the defined value.

In example 14, the at least one computer-readable storage medium of any of examples 12-13 may include instructions that, when executed, cause a system to preserve a vertex in the vertex cache when a value of the reference bitstream entry corresponding to the processed vertex is equal to a second defined value different than the defined value.

In example 15, the at least one computer-readable storage medium of any of examples 12-14 may include instructions that, when executed, cause a system to send the processed vertex for primitive assembly when the processed vertex is detected in the vertex cache and the value of the reference bitstream entry is equal to a second defined value different than the defined value.

In example 16, the at least one computer-readable storage medium of any of examples 12-15 may include instructions that, when executed, cause a system to send a processed vertex for primitive assembly without storing the processed vertex in the vertex cache when the reference bitstream entry is equal to the defined value and the processed vertex is not presently in the vertex cache.

In example 17, the at least one computer-readable storage medium of any of examples 12-16 may include instructions that, when executed, cause a system to read a most significant bit within each entry of the index buffer to determine a value of the reference bitstream entry.

In example 18, a computer implemented method for processing vertices in a graphics pipeline includes storing in an index buffer an index stream having a multiplicity of index entries corresponding to vertices of a mesh; reading a reference bitstream comprising a multiplicity of bitstream entries, each bitstream entry corresponding to an index entry of the index stream; and removing a processed vertex from the vertex cache when a value of the reference bitstream entry corresponding to the processed vertex is equal to a defined value.

In example 19, the vertex cache of example 18 may include a first-in-first-out (FIFO) structure.

In example 20, the computer implemented method of any of examples 18-19 may include removing a first vertex from the vertex cache having less residence time in the vertex cache than a second vertex when the value of a reference bitstream entry for the first vertex is equal to the defined value.

In example 21, the computer implemented method of any of examples 18-20 may include preserving a vertex in the vertex cache when a value of the reference bitstream entry corresponding to the processed vertex is equal to a second defined value different than the defined value.

In example 22, the reference bitstream of any of examples 18-21 may include a 1-bit bitstream in which the defined value is equal to one.

In example 23, the computer implemented method of any of examples 18-22 may include storing the processed vertices as shaded vertices in a vertex shader cache.

In example 24, the computer implemented method of any of examples 18-23 may include sending the processed vertex for primitive assembly when the processed vertex is detected in the vertex cache and the value of the reference bitstream entry is equal to a second defined value different than the defined value.

In example 25, the computer implemented method of any of examples 18-24 may include sending a processed vertex for primitive assembly without storing the processed vertex in the vertex cache when the reference bitstream entry is equal to the defined value and the processed vertex is not presently in the vertex cache.

In example 26, the computer implemented method of any of examples 18-25 may include reading a most significant bit within each entry of the index buffer to determine a value of the reference bitstream entry.

In example 27 a system to perform vertex processing includes a general purpose processor circuit (CPU) to issue a draw call to generate a mesh; an index buffer to store an index stream having a multiplicity of index entries corresponding to vertices of the mesh; a vertex cache to store a multiplicity of processed vertices of the mesh; a graphics processor circuit; and a vertex manager for execution on the graphics processor circuit to read a reference bitstream comprising a multiplicity of reference bitstream entries, each reference bitstream entry corresponding to an index entry of the index stream, and to remove a processed vertex from the vertex cache when a value of the reference bitstream entry corresponding to the processed vertex is equal to a defined value.

In example 28, the vertex cache of example 27 may comprise a first-in-first-out (FIFO) structure.

In example 29, the vertex manager of any of examples 27-28 may be for execution on the graphics processor circuit to remove a first vertex from the vertex cache having less residence time in the vertex cache than a second vertex when the value of a reference bitstream entry for the first vertex is equal to the defined value.

In example 30, the vertex manager of any of examples 27-29 may be for execution on the graphics processor circuit to preserve a vertex in the vertex cache when a value of the reference bitstream entry corresponding to the processed vertex is equal to a second defined value different than the defined value.

The example 31, the processor circuit of any of examples 27-30 may comprise a graphics processing unit (GPU).

The example 32, the reference bitstream of any of examples 27-31 may comprise a 1-bit bitstream in which the defined value is equal to one.

The example 33, the vertex cache of any of examples 27-32 may comprise a vertex shader cache to store the processed vertices as shaded vertices.

In example 34, the vertex manager of any of examples 27-33 may be for execution on the graphics processor circuit to send the processed vertex for primitive assembly when the processed vertex is detected in the vertex cache and the value of the reference bitstream entry is equal to a second defined value different than the defined value.

In example 35, the vertex manager of any of examples 27-34 may be for execution on the graphics processor circuit to send a processed vertex for primitive assembly without storing the processed vertex in the vertex cache when the reference bitstream entry is equal to the defined value and the processed vertex is not presently in the vertex cache.

In example 36 the index buffer of any of examples 27-35 may store the index stream and reference bitstream.

In examples 37, the index buffer of any of examples 27-36 may store a plurality of index buffer entries comprising a defined bit size, the vertex manager for execution on the processor circuit to read a most significant bit (MSB) within each entry of the index buffer to determine a value of the reference bitstream entry.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a. an index buffer to store an index stream having a multiplicity of index entries corresponding to vertices of a mesh;
   b. a vertex cache to store a multiplicity of processed vertices of the mesh;
   c. a processor circuit; and
   d. a vertex manager for execution on the processor circuit to read a reference bitstream comprising a multiplicity of reference bitstream entries, each reference bitstream entry corresponding to an index entry of the index stream and each reference bitstream entry to indicate whether a vertex is subsequently referenced during assembly of the mesh, and to remove a processed vertex from the vertex cache when a value of the reference bitstream entry corresponding to the processed vertex is equal to a defined value, the vertex manager to send a processed vertex for primitive assembly without storing the processed vertex in the vertex cache when the reference bitstream entry is equal to the defined value and the processed vertex is not presently in the vertex cache.

2. The apparatus of claim 1, the vertex cache comprising a first-in-first-out (FIFO) structure.

3. The apparatus of claim 2, the vertex manager for execution on the processor circuit to remove a first vertex from the vertex cache having less residence time in the vertex cache than a second vertex when the value of a reference bitstream entry for the first vertex is equal to the defined value.

4. The apparatus of claim 1, the vertex manager for execution on the processor circuit to preserve a vertex in the vertex cache when a value of the reference bitstream entry corresponding to the processed vertex is equal to a second defined value different than the defined value.

5. The apparatus of claim 1, the processor circuit comprising a graphics processing unit (GPU).

6. The apparatus of claim 1, the reference bitstream comprising a 1-bit bitstream in which the defined value is equal to one.

7. The apparatus of claim 1, the vertex cache comprising a vertex shader cache to store the processed vertices as shaded vertices.

8. The apparatus of claim 1, the vertex manager for execution on the processor circuit to send the processed vertex for primitive assembly when the processed vertex is detected in the vertex cache and the value of the reference bitstream entry is equal to a second defined value different than the defined value.

9. The apparatus of claim 1, the index buffer to store the index stream and reference bitstream.

10. The apparatus of claim 9, the index buffer to store a plurality of index buffer entries comprising a defined bit size, the vertex manager for execution on the processor circuit to read a most significant bit (MSB) within each entry of the index buffer to determine a value of the reference bitstream entry.

11. At least one non-transitory computer-readable storage medium comprising instructions that, when executed, cause a system to:
   a. read an index stream from an index buffer having a multiplicity of index entries corresponding to vertices of a mesh;
   b. read a reference bitstream comprising a multiplicity of bitstream entries, each bitstream entry corresponding to an index entry of the index stream and each reference bitstream entry to indicate whether a vertex is subsequently referenced during assembly of the mesh;
   c. send a signal to remove a processed vertex from a vertex cache when a value of the reference bitstream entry corresponding to the processed vertex is equal to a defined value; and
   send a processed vertex for primitive assembly without storing the processed vertex in the vertex cache when the reference bitstream entry is equal to the defined value and the processed vertex is not presently in the vertex cache.

12. The at least one computer-readable storage medium of claim 11 comprising instructions that, when executed, cause a system to remove a first vertex from the vertex cache having less residence time in the vertex cache than a second vertex when the value of a reference bitstream entry for the first vertex is equal to the defined value.

13. The at least one computer-readable storage medium of claim 11 comprising instructions that, when executed, cause a system to preserve a vertex in the vertex cache when a value of the reference bitstream entry corresponding to the processed vertex is equal to a second defined value different than the defined value.

14. The at least one computer-readable storage medium of claim 11 comprising instructions that, when executed, cause a system to send the processed vertex for primitive assembly when the processed vertex is detected in the vertex cache and the value of the reference bitstream entry is equal to a second defined value different than the defined value.

15. The at least one computer-readable storage medium of claim 11 comprising instructions that, when executed, cause a system to read a most significant bit within each entry of the index buffer to determine a value of the reference bitstream entry.

16. A computer implemented method, comprising:
   a. storing in an index buffer an index stream having a multiplicity of index entries corresponding to vertices of a mesh;
   b. reading a reference bitstream comprising a multiplicity of bitstream entries, each bitstream entry corresponding to an index entry of the index stream and each reference bitstream entry to indicate whether a vertex is subsequently referenced during assembly of the mesh;
   c. removing a processed vertex from the vertex cache when a value of the reference bitstream entry corresponding to the processed vertex is equal to a defined value; and
   sending a processed vertex for primitive assembly without storing the processed vertex in the vertex cache when the reference bitstream entry is equal to the defined value and the processed vertex is not presently in the vertex cache.

17. The computer implemented method of claim 16, the vertex cache comprising a first-in-first-out (FIFO) structure.

18. The computer implemented method of claim 17, comprising removing a first vertex from the vertex cache having less residence time in the vertex cache than a second vertex when the value of a reference bitstream entry for the first vertex is equal to the defined value.

19. The computer implemented method of claim 16, comprising removing a first vertex from the vertex cache having less residence time in the vertex cache than a second vertex when the value of a reference bitstream entry for the first vertex is equal to the defined value.

20. The computer implemented method of claim 16 comprising preserving a vertex in the vertex cache when a value of the reference bitstream entry corresponding to the processed vertex is equal to a second defined value different than the defined value.

21. The computer implemented method of claim 16 comprising sending the processed vertex for primitive assembly when the processed vertex is detected in the vertex cache and the value of the reference bitstream entry is equal to a second defined value different than the defined value.

22. The computer implemented method of claim 16 comprising reading a most significant bit within each entry of the index buffer to determine a value of the reference bitstream entry.

* * * * *